United States Patent [19]

Knobel et al.

[11] Patent Number: 4,617,325
[45] Date of Patent: Oct. 14, 1986

[54] ORGANIC POLYMERS CONTAINING ANTISTATIC AGENTS COMPRISING THE POLYMER HAVING DISPERSED THEREIN A NON-VOLATILE IONIZABLE METAL SALT AND A PHOSPHATE ESTER

[75] Inventors: Thomas M. Knobel; Earl E. Kennedy; Mary A. Walker, all of Lake Jackson, Tex.

[73] Assignee: The Dow Chemical Company, Midland, Mich.

[21] Appl. No.: 751,352

[22] Filed: Jul. 2, 1985

Related U.S. Application Data

[63] Continuation-in-part of Ser. No. 644,586, Aug. 27, 1984, abandoned.

[51] Int. Cl.⁴ ............................................. C08G 18/14

[52] U.S. Cl. .................................... 521/105; 252/182; 521/107; 524/127; 524/141; 524/142; 524/143; 524/144; 524/145; 524/701; 524/710; 524/711; 524/712; 524/910; 524/912

[58] Field of Search ................ 521/107, 105; 252/182; 524/127, 141, 142, 143, 144, 145, 701, 710, 711, 712, 910, 912

[56] References Cited

U.S. PATENT DOCUMENTS 3,041,296  6/1962  Lindlaw et al. ..................... 524/711
4,165,411  8/1979  Marans et al. ...................... 521/107

OTHER PUBLICATIONS

Hala et al., *Canadian J. Chem.* 48, 1970, pp. 2843–2846.
Hala et al., *J. Chem. Soc. A*, 21, 1971, pp. 3437–3441.

Primary Examiner—Maurice J. Welsh
Attorney, Agent, or Firm—Gary C. Cohn

[57] ABSTRACT

An antistatic agent for polymers, particularly polyurethanes is disclosed comprising an ionizable metal salt and an enhancer comprising a phosphate ester.

15 Claims, No Drawings

ORGANIC POLYMERS CONTAINING ANTISTATIC AGENTS COMPRISING THE POLYMER HAVING DISPERSED THEREIN A NON-VOLATILE IONIZABLE METAL SALT AND A PHOSPHATE ESTER

CROSS REFERENCE TO THE RELATED APPLICATION

This application is a continuation-in-part of application Ser. No. 644,586, filed Aug. 27, 1984 and now abandoned.

BACKGROUND OF THE INVENTION

This invention relates to an antistatic agent for polymers.

Most organic polymers are poor conductors of electricity. As such, they cannot be satisfactorily used without modification in applications which require a conductive or semi-conductive material, such as static dissipation materials.

Due to their beneficial properties such as low cost, easy processability, good strength and light weight, it is often desirable to substitute polymeric materials into applications which in the past required metals or other materials. Accordingly, it has been attempted to prepare semi-conductive or conductive polymers.

It is known, for example, to incorporate conductive fibers, particulates or powders into a polymer in order to increase its conductivity. Although good conductivity can be achieved in this manner, the high loadings of filler material (generally 20% or more) needed to obtain such conductivity greatly alter properties of the polymer, often making it unsuitable for its desired purpose. In addition, such highly filled polymers are often much more expensive than the unfilled polymer. Yet another problem encountered with certain such fillers, especially fibers, is they often break, oxidize or otherwise lose their effectiveness over time.

It is also known to treat the surfaces of polymers with amines or quaternary ammonium compounds to render them antistatic. However, such treatments are often removed from the polymer during its normal use, causing the polymer to lose its antistatic properties.

Another approach has been to incorporate ionic salts into a polymer to increase its conductivity. For example, in Dupon et al. *J. Elec. Chem. Soc.* 128:715 (1981) it is taught to incorporate salts such as sodium thiocyanate into high molecular weight poly(ethylene oxide) to increase its conductivity. French Pat. Nos. 2,442,513-4 demonstrate the dissolution of mixed alkaki metal thiocyanate salts into poly(alkylene oxide) polymers for the same reason. In these references, the concentration of salt is generally at least about 5 weight percent, and is preferably as high as about 25 weight percent. Such a high level of salt often imparts undesirable properties to the polymer, such as sensitivity to water. When such levels of salts are employed in a flexible polyurethane foam, the foam often fails, prunes or collapses due to the formation of undesired closed cells.

Although inclusion of these salts has improved the conductivity of the polymers, it would be desirable from the standpoint of utility and cost to further increase the conductivity of the polymer while minimizing the salt content.

SUMMARY OF THE INVENTION

The present invention is, in one aspect, an organic polymer having dispersed therein
(a) a non-volatile ionizable metal salt and
(b) an enhancer compound comprising a phosphate which is compatible with said organic polymer and in which said metal salt is soluble.

Such additive, when incorporated at an effective level in an organic polymer, imparts to the polymer a higher conductivity than that which is imparted by the ionizable salt alone, even though the enhancer itself does not normally contribute significantly to the conductivity of the polymer.

In another aspect, this inventin is an active hydrogen containing composition containing the aforementioned additive, comprising (a) a polyahl, (b) a non-volatile, ionizable metal salt and (c) an enhancer as described hereinbefore. Components (b) and (c) are present in amounts sufficient to increase the conductivity of an organic polyisocyanate polymer prepared from said active hydrogen containing composition.

Such active hydrogen-containing composition, when reacted with a polyisocyanate, forms a polymer having a higher conductivity than a like polymer containing the ionizable salt alone.

In yet another aspect, this invention is an organic polyisocyanate polymer which comprises the reaction product of a polyisocyanate and a polyahl, wherein the reaction thereof is conducted in the presence of (a) a non-volatile ionizable metal salt and (b) an enhancer as described hereinbefore, wherein components (a) and (b) are present in an amount sufficient to increase the conductivity of the organic polyisocyanate polymer.

In still another aspect, this invention is a polymer containing sufficient of the aforementioned additive to increase the conductivity of the polymer.

DETAILED DESCRIPTION OF THE INVENTION

The additive of this invention comprises, as one component, an ionizable salt. Said salt is one containing at least one metal cation which is in ionic association with at least one anion. By ionizable, it is meant that the salt is one which provides mobile ions in the presence of an electric field.

The cation can be any metal which forms an ionizable salt with one or more anions, including those in Row 2, groups IA and IIA; Row 3, groups IA, IIA and IIIA; Row 4, groups IA-IVA and IB-VIII B; Rows 5 and 6, groups IA-VA and IB-VIII B; and the lanthanide series. Preferably, the metal is an alkali metal, an alkaline earth metal, Co, Ni, Fe, Cu, Cd, Zn, Sn, Al or Ag.

The anion is any which forms an ionizable salt with the metal cation. The anion is advantageously the conjugate base of an inorganic acid or a $C_2$-$C_4$ carboxylic acid. Suitable ions include, for example, the halides, i.e. $F^-$, $Cl^-$, $Br^-$, and $I^-$; $NO_3^-$, $SCN^-$, $SO_4^{2-}$, $HSO_4^-$, $SO_3^{2-}$, $HSO_3^-$, $ClO_4^-$, $CO_3^{2-}$, $PO_4^{3-}$, $H_2PO_4^-$, $HPO_4^{2-}$, $PO_3^{3-}$, $HPO_3^{2-}$, $H_2PO_3^-$, acetate, tetraorganoboride, particularly tetraalkyl and tetraphenylboride and the like. Of these, the halides, especially $Cl^-$, $Br^-$ and $I^-$; the tetraorganoborides and acetate are preferred on the basis of generally better performance. Most preferred are the tetraorganoborides, which is less reactive with metals, water or other materials which are often present in the polymer or come in contact with the polymer than are most other anions.

Exemplary ionizable salts include, for example, zinc chloride, copper chloride, cobalt chloride, tin chloride, lithium chloride, iron chloride, magnesium chloride, potassium iodide, sodium iodide, lithium nitrate, cobalt nitrate, sodium acetate, cadmium acetate, zinc acetate, antimony trifluoride, sodium tetraphenylboride, lithium tetraphenylboride, potassium tetraphenylboride and the like. Most preferred are the alkali metal tetraphenylboride salts.

Another critical component of the additive is an enhancer. The enhancer comprises a phosphate ester in which the ionizable salt is soluble or dispersible which does not substantially increase the conductivity of the polymer in the absence of the ionizable salt, but substantially increases the conductivity of the polymer containing the ionizable salt.

The enhancer is considered not to substantially increase the conductivity of a polymer in the absence of an ionizable salt if the conductivity of the polymer containing the enhancer is not more than 100 times that of the polymer alone, or if the polymer containing the enhancer (but no ionizable salt) is too nonconductive to be measured for static dissipation according to the test described herein, or if the polymer containing the enhancer (but no ionizable salt) dissipates 99% of an applied static charge in 60 seconds or greater.

Also suitable are phosphate esters and diphosphate esters represented by the structures

 (IV)

and

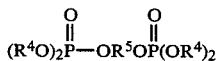 (V)

wherein each $R^4$ is independently an inertly substituted organic radical, preferably a $C_2$-$C_4$ alkyl or haloalkyl radical, and $R^5$ is an inertly substituted organic diradical, preferably an alkylene or alkyl ether diradical. Suitable phosphate esters and diesters include triethylphosphate, tributylphosphate, tributoxyethyl phosphate, di(2-chloroethyl)phosphoroethyl di(2-chloroethyl)phosphate and the like. The last compound is sold commercially as Thermolin 101.

The additive of this invention can contain the aforementioned ionizable salt and enhancer in any ratio such that when an effective amount of the additive is incorporated into a polymer, the conductivity of the polymer is greater than that of a like polymer containing only the ionizable salt. Generally, the additive contains about 0.5-100, preferably about 1-25 moles by weight of said enhancer per mole of ionizable salt.

The additive of this invenion may be added to an organic polymer as a mixture of the foregoing components, or each of said component may be added separately to the polymer.

The polymer may be any into which the additive of the invention can be dispersed. The ability to disperse the antistatic agent is to a large extent dependent on the compatability of the enhancer and the organic polymer. Accordingly, it is generally desirable to select the organic polymer and the enhancer together so that the two components are compatible. Alternatively, the antistatic agents and the organic polymer can be "compatibilized" by use of a cosolvent or other material which compatibilizers the polymer and the enhancer.

Such polymers include addition polymers as well as condensation polymers, thermoplastics and thermosetting polymers. Preferably, however, the polymer is a polyurethane or other polymer based on an organic polyisocyanate.

Addition polymers and condensation polymers are useful herein as are either thermoplastic or thermosetting polymers. Exemplary of the polymers that are useful herein are polyolefins such as polyethylene, polypropylene and the like, polymers of conjugated dienes such as butadiene; poly(vinyl aromatics) such as polystyrene, poly(vinyl toluene) and the like; polycarbonates; acrylic resins such as polymers of acrylic and methacrylic acid and alkyl or hydroxylethyl esters thereof; polymer of vinyl chloride, vinylidene chloride or mixtures thereof; polyesters; copolymers of ethylene with carbon monoxide or vinyl alcohol; and polyurethanes or other polymers based on an organic polyisocyanate. Blends, alloys and copolymers of the foregoing polymers are also useful.

For the purpose of this invention the term polymers based on organic polyisocyanates and "organic polyisocyanate polymers" are understood to mean those which can be obtained by reaction of an organic polyisocyanate with an organic compound which contains at least two Zerewitinoff active hydrogen atoms, e.g. polycarbodiimides, polyisocyanurates, polyureas, polybiurets, polyamides, polyallophanates or polyurethanes or polymers containing a mixture of urethane, urea, allophanate, biuret, amide, carbodiimide and/or isocyanurate groups, and any other polymer based on a polyisocyanate. The process described here is particularly suitable for the production of polymers which contain urethane and urea groups prepared from a reaction mixture containing an organic polyisocyanate.

All such polymers based on organic polyisocyanates are also referred to herein by the shorthand term "polyurethanes".

In the preparation of polyurethane foams containing the additive of this invention, said additive is advantageously present in a reacting mixture of a polyahl (defined hereinafter) and a polyisocyanate. Since in preparing such reaction mixture it is preferable to add all the components in as few streams as possible, it is generally preferred to pre-mix the additive of this invention with the polyahl to form an active hydrogen-containing composition which is then reacted with the polyisocyanate.

The term "polyahl" as used herein, includes any polyfunctional compound having at least two active hydrogen atoms. For the purposes of this invention, an active hydrogen moiety refers to a moiety containing a hydrogen atom which, because of its position in the molecule, displays significant activity according to the Zerewitnoff test described by Woller in the Journal of American Chemical Society, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

The additive of this invention may be added to the polyahl as a mixture of the ionizable salt and the enhancer in the desired proportions or preferably as a "concentrate" comprising the additive dissolved or dispersed in a polyahl or mixture thereof. In such "concentrate", the concentration of additive is somewhat higher than that normally present in the active hydrogen-containing composition which is reacted with the polyisocyanate. Such concentrate normally contains from about 0.5–50, preferably 1–25, more preferably 1–10 percent by weight of the ionizable salt, and a corresponding amount of enhancer. A "B-side" for preparing polyurethanes typically contains about 0.015–20, preferably about 0.075 to 10 percent by weight of the ionizable salt.

If desired, each component of the additive of this invention may be added individually to the polyahl.

Sufficient of the additive of this invention is used to increase the conductivity of the product polymer. In general, the conductivity of the polymer is increased when the polymer contains from about 0.01–10, preferably 0.05–5 percent by weight of the ionizable salt. As stated hereinbefore, the polymer advantageously contains from about 0.5–100, preferably 1–25 moles of the enhancer per mole ionizable salt.

In making a polyurethane polymer containing the additive of this invention, the polyahls, polyisocyanates, and other components, if any, are those conventionally employed in the preparation of polyurethane polymers.

Suitable polyahls include polyether polyols, polyester polyols, polyhydroxyl-containing phosphorous compounds, hydroxyl-terminated acetal resins, hydroxyl terminated amines and polyamines, the corresponding amine-terminated polyether and/or polyester polyols, the so-called polymer or copolymer polyols which comprise a dispersion of an addition polymer as copolymer in a continuous polyahl phase, as well as other active hydrogen-containing compounds which are known to be useful in the preparation of polyurethane polymers. Examples of these and other suitable polyahls are described more fully in U.S. Pat. No. 4,394,491, particularly in columns 3–5 thereof. Suitable copolymer polyols include those described in U.S. Pat. Nos. Re 29,118, Re 28,715 and U.S. Pat. No. 4,394,491.

The molecular weight and functionality of the polyahl will depend on the properties desired in the polyurethanes. For example, the formation of flexible polyurethanes is favored by using relatively high equivalent weight (ie. 250–10,000) polyahl and/or one having relatively low (2–4) functionality. More rigid polyurethanes are generally prepared from low equivalent weight (i.e. 50–250) polyahls and/or those having a high functionality (i.e. 3–16).

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-diphenyl diisocyanate, and 3,3'-dimethyldiphenylpropane-4,4',4'-diisocyanate; the triisocyanate polymethylene polyphenylisocyanate and tolylene-2,4,6-triisocyanate; and the tetraisocyanates such as 4,4'-dimethyldiphenylmethane-2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Especially preferred are methylene-bridged polyphenyl polyisocyanates, due to their ability to crosslink the polyurethane. The isocyanate index (ratio of equivalents of isocyanates to equivalents of active hydrogens) is advantageously from about 0.8–10, preferably about 1.0–4.0, more preferably 1.0–1.25.

Prepolymers or quasi-prepolymers of the foregoing polyisocyanates are also useful herein.

In addition to the aforementioned polyahl, polyisocyanate and additive, various additional components may be employed in preparing the polyurethane polymer.

The urethane reaction of polyisocyanate with a polyahl is advantageously carried out in the presence of an amount of urethane-type catalyst which is effective to catalyze the reaction of the polyahl with the polyisocyanate.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408. Catalyst for the trimerization of polyisocyanates, such as alkali metal alkoxides, may also optionally be employed herein.

If a polyurethane foam is to be prepared, a blowing agent is employed. Such blowing agent comprises an inert gas, a low boiling organic liquid such a methylene chloride or trichlorofluromethane, and/or a chemical blowing agent such as water, peroxides or azo compounds which react during the urethane polymerization reaction to generate a gas.

In preparing a polyurethane foam, a wetting agent(s) or surface-active agent(s) is generally necessary since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

Other optional components include conventional additives such as pigments, fillers, flame retardant, stabilizers, additional cell openers and the like.

Such catalysts, blowing agents, surfactants and other optional components are preferably blended with the polyahl before the reaction thereof with the polyisocyanate.

The resulting polyurethane polymer is substantially more conductive than a like polymer which does not contain the additive of this invention, or which contains only one of the two critical components of said additive.

In terms of conductivity, the additive of this invention, when incorporated into the polymer so that the polymer contains about 0.01–10% by weight of the ionizable salt, generally increases the conductivity of the polymer by about a factor of about 100 to 100 million ($10^2$–$10^9$).

The increased conductivity of the polymer containing the additive is also seen in its ability to dissipate a static charge. Although the polymer itself often is incapable of dissipating a static charge, the polymer containing the additive is able to rapidly dissipate static electricity. Often such polymer containing the additive can dissipate 99% of an applied static charge in a relatively short time, i.e. less than about 50, more preferably less than about 15, most preferably less than 2 seconds.

In general, the advantages of this invention are obtained without significant adverse affects on the physical properties of the polymer.

The polymer containing the additive is useful, for example, as a "solid electrolyte" for batteries, and for preparing antistatic packaging or shelving for materials such as electronic devices which are sensitive to or damaged by a rapid discharge of static electricity or exposure to static electric fields. This invention is also useful in making adhesives, elastomers, rigid foams and flexible foams, films, coatings and the like. Such materials are useful to prepare drive belts for engines, handling equipment for explosive materials, antistatic carpet and other flooring, and the like.

The following examples are provided to illustrate the invention and not to limit the scope thereof. All parts and percentages are by weight unless otherwise indicated.

EXAMPLE 1

Polyurethane foam Sample No. 1 and Comparative Sample Nos. C-1 and C-2 are prepared from the components, and dissipate a static charge as indicated in Table III.

The ability of each of these foams to dissipate a static charge is measured on an Electrotech 406C static decay meter. The sample is conditioned at <15% relative humidity for 24 hours. A 5½"×3"×2" sample is placed into the meter at 72° F. and charged to +5000 VDC at 14% relative humidity. The time required for this charge to dissipate 99% of the charge is measured. The shorter the time required, the better the ability of the foam to dissipate the charge, and the more conductive the polymer.

TABLE III

| | Parts by Weight | | |
|---|---|---|---|
| Component | Sample No. 1 | Comp. Sample C-1* | Comp. Sample C-2* |
| Polyol[1] | 100 | 100 | 100 |
| H$_2$O | 3.6 | 3.6 | 3.6 |
| Surfactant[2] | 0.8 | 0.8 | 0.8 |
| Amine Catalyst[3] | 0.1 | 0.1 | 0.1 |
| Tin Catalyst[4] | 0.15 | 0.15 | 0.15 |
| NaSCN | 1.0 | 0 | 1.0 |
| Thermolin 101[5] | 10.0 | 10.0 | 0 |
| Toluene diisocyanate[6] | 46.6 (108 index) | 46.6 (108 index) | 46.6 (108 index) |
| Decay Time | | | |
| +5000 V–+50 V | 0.43 | NM[6] | 2.07 |
| −5000 V–(−)50 V | 0.32 | NM[6] | 1.44 |

[1] A glycerine-initiated polyether polyol having an equivalent weight of about 1030.
[2] BF-2370, a polysiloxane surfactant sold by Goldschmidt Chemical Corp.
[3] Niax A-1, a tertiary amine catalyst sold by Union Carbide.
[4] T-9, an organotin catalyst sold by M-T Chemicals.
[5] A diphosphate ester available from Olin Chemical.
[6] NM - not meaningful since the sample is too nonconductive to test.
*Not an example of the invention.

As can be seen from the results in Table II, the inclusion of the enhancer alone does not impart conductivity to the polymer. However, when the enhancer is used in conjunction with a ionizable salt, the polymer dissipates a charge in about 75% less time than does a polymer containing the salt alone.

EXAMPLE 2

Sample No. 1 is repeated, this time using 0.2 parts sodium tetraphenylboride in place of the NaSCN. The decay time, +5000 V–+50 V, is 0.35 seconds.

We claim:

1. An organic polymer composition comprising an organic polymer having dispersed therein
   (a) an alkali metal tetraorganoboride and
   (b) an enhancer compound comprising a phosphate ester which is compatible with said organic polymer and in which said alkali metal tetraorganoboride is soluble.

2. The polymer composition of claim 1 wherein said enhancer compound increases the conductivity of said organic polymer in the presence of said alkali metal tetraorganoboride, but does not substantially increase the conductivity of said organic polymer in the absence of said alkali metal tetraorganoboride.

3. The polymer composition of claim 2 wherein the enhancer compound is selected from the group consisting of triethylphosphate, tributylphosphate, and di(2-chloroethyl)phosphoroethyl di(2-chloroethyl)phosphate.

4. The polymer composition of claim 2 wherein the alkali metal tetraorganoboride comprises sodium tetraorganoboride.

5. The polymer composition of claim 2 wherein the organic polymer comprises a polyurethane, a polyolefin, polyvinyl chloride, polyvinylidene chloride, a polyester, a poly(vinyl aromatic), an acrylonitrile-butadiene-styrene polymer a polycarbonate or a copolymer of an olefin with carbon monoxide or vinyl alcohol.

6. The polymer composition of claim 5 containing about 0.01–10 weight percent alkali metal tetraorganoboride and about 1–25 moles of said enhancer compound per mole of alkali metal tetraorganoboride.

7. An active hydrogen containing composition comprising a polyahl or mixture of polyahls having dispersed therein
   (a) a non-volatile alkali metal tetraorganoboride and
   (b) an enhancer comprising a phosphate ester wherein said alkali metal tetraorganoboride and enhancer are present in an amount sufficient to increase the conductivity of an organic polyisocyanate polymer prepared from said active hydrogen containing composition.

8. The active hydrogen containing composition of claim 7 further comprising a blowing agent and a catalyst for a reaction between said polyahl and an organic polyisocyanate.

9. The active hydrogen containing composition of claim 7 wherein said alkali metal tetraorganoboride comprises from about 0.015–20 percent by weight of the active hydrogen containing composition.

10. The composition of claim 9 containing about 1–25 moles of enhancer per mole of alkali metal tetraorganoboride.

11. The composition of claim 7 wherein said alkali metal tetraorganoboride comprises sodium tetraphenylboride.

12. An additive for increasing the conductivity of an organic polymer, comprising
(a) an alkali metal tetraorganoboride and
(b) an enhancer comprising a phosphate ester in which said alkali metal tetraorganoboride is soluble which enhancer increases the conductivity of a polymer containing said alkali metal tetraorganoboride, but which does not substantially increase the conductivity of said organic polymer in the substantial absence of said alkali metal tetraorganoboride.

13. The additive of claim 12 containing about 1–25 moles of the enhancer per mole of alkali metal tetraorganoboride.

14. The additive of claim 13 containing from about 1–20 percent alkali metal tetraorganoboride by weight.

15. The additive of claim 12 wherein the alkali metal tetraorganoboride is sodium tetraphenylboride.

* * * * *